US006413351B1

(12) United States Patent
Goldman et al.

(10) Patent No.: US 6,413,351 B1
(45) Date of Patent: Jul. 2, 2002

(54) EDGE BONDING FOR AMORPHOUS METAL TRANSFORMER

(75) Inventors: Ira Goldman, Waterbury, CT (US); Terry W. Grant, Greeneville, TN (US); Joseph K. Grote; Ralph L. Collins, both of Hickory, NC (US); Kirk Houser, Greeneville, TN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/548,227

(22) Filed: Apr. 12, 2000

Related U.S. Application Data

(62) Division of application No. 08/658,906, filed on May 31, 1996, now abandoned.

(51) Int. Cl.[7] .......... B32B 31/14

(52) U.S. Cl. .......... 156/278; 156/305; 336/177; 336/234

(58) Field of Search .......... 156/278, 275.1, 156/275.7, 305; 336/177, 210, 213, 234

(56) References Cited

U.S. PATENT DOCUMENTS

| | | | | |
|---|---|---|---|---|
| 3,616,056 A | * | 10/1971 | Sims | |
| 4,413,406 A | | 11/1983 | Bennett et al. | 29/609 |
| 4,615,106 A | | 10/1986 | Grimes et al. | 29/605 |
| 4,618,632 A | * | 10/1986 | Su | |
| 4,648,929 A | | 3/1987 | Siman | 156/188 |
| 4,663,605 A | | 5/1987 | Lee | 336/197 |
| 4,707,678 A | | 11/1987 | Siman | 336/210 |
| 4,713,297 A | | 12/1987 | Verbunt | 428/414 |
| 4,734,975 A | | 4/1988 | Ballard et al. | 29/606 |
| 4,741,096 A | | 5/1988 | Lee et al. | 29/605 |
| 4,789,849 A | | 12/1988 | Ballard et al. | 336/210 |
| 4,892,773 A | | 1/1990 | Chenoweth et al. | 428/121 |
| 4,910,863 A | | 3/1990 | Valencic et al. | 29/606 |
| 5,092,027 A | * | 3/1992 | Denner | 336/210 X |
| 5,134,771 A | * | 8/1992 | Lee et al. | 336/213 X |
| 5,179,776 A | | 1/1993 | Boenitz et al. | 29/609 |
| 5,248,952 A | * | 9/1993 | Bisbee | 336/213 |
| 5,331,304 A | | 7/1994 | White et al. | 336/234 |
| 5,426,846 A | | 6/1995 | White et al. | 29/609 |
| 5,441,783 A | * | 8/1995 | Silgailis et al. | 336/213 X |

OTHER PUBLICATIONS

The Hillas Packaging Network. 3M Plastic Adhesives. Datasheet [online], [retrieved on Apr. 25, 2001]. Retrieved from the Internet: <URL:www.industrial–adhesive.com/Plastic.html>.*

* cited by examiner

*Primary Examiner*—Curtis Mayes
(74) *Attorney, Agent, or Firm*—Cantor Colburn LLP

(57) ABSTRACT

Provided is a magnetic core for transformers which is made at least in part of amorphous metal lamination layers. The lamination layers are coated on the edges with a low-stress, low-viscosity coating material which, when cured, becomes sufficiently rigid to support the lamination layers of amorphous material. The coating material can be applied to the entire edge surface of both sides of the core or only to select portions of the edges on either side. In either instance, the coating material is applied in a manner that allows built-in stresses to relax out before all the coating material is fully cured.

8 Claims, 2 Drawing Sheets

Epoxy coated areas of core

EDGE BONDING FOR AMORPHOUS METAL TRANSFORMER

CROSS-REFERENCE TO RELATED APPLICATIONS

This application is a divisional of and claims the benefit of the filing date of U.S. patent application Ser. No. 08/658,906 filed May 31, 1996, now abandoned the entire contents of which is hereby incorporated by reference.

BACKGROUND OF THE INVENTION

This invention relates to magnetic cores made from a plurality of lamination layers, such as amorphous metal, in which the edges of the lamination layers are coated with an adhesive material to support the lamination layers and to isolate the lamination layers of the magnetic core from the remainder of the transformer. More particularly, this invention relates to the application of a low-viscous thermoset resin which is allowed to cure incrementally while restraining materials are removed from the core laminations in a manner that achieves stress relief in the lamination layers without sacrificing the structural integrity of the core.

Transformer cores are commonly manufactured using silicon steel or amorphous metal. While the cores made of silicon steel are rigid and not very stress sensitive, the cores of amorphous metal, while having improved magnetic properties, are more flexible and require careful handling during manufacturing. Moreover, magnetic cores of amorphous metal are very brittle after annealing and tend to produce chips or flakes which can subsequently interfere with the normal operations of the transformer. To enhance the structural integrity of the amorphous metal cores and to increase the ease of manufacturing, amorphous metal cores are typically coated on the edges with a rigid material. In many cases, this rigid material is formed from a composite of two different materials.

At present, there are various systems used to bond the edges of the amorphous lamination layers of transformer cores. For example, one such system employs the use of a heavy solvent-based glue system. This system is employed because it can provide sufficient support to the lamination layers of the magnetic core so as to withstand the demands of the manufacturing process and yet is sufficiently flexible to allow for the release of stresses which build up in the lamination layers during the manufacturing process. However, the glue system has several disadvantages. In particular, the glue system is solvent based and thus is unfriendly from an environmental and health and safety standpoint. Moreover, the glue system provides only a minimal amount of support and is only moderately successful in preventing the penetration of amorphous flakes from the magnetic core of a transformer into the oil in which it is immersed and subsequently the coils of the transformer.

Alternatively, dual-layer, composite coatings have been employed to enhance the structural integrity and to prevent amorphous metal flake penetration. For example, U.S. Pat. No. 4,648,929 discloses the use of a dual coating of a less-rigid, inner adhesive material and a more-rigid, higher strength outer material.

Also disclosed in U.S. Pat. No. 5,441,783 is a composite material formed of a porous material which permits impregnation of a highly viscous material, i.e., a material having a viscosity of at least about 100,000 cps, and a viscous coating material having a viscosity of at least 100,000 cps.

STATEMENT OF THE PROBLEM

One problem with using prior art methods for bonding the edges of amorphous metal cores is that these methods do not permit stresses in the layers of the core material to relax out. As a result, the cores contain unacceptably high losses as measured in watts.

Another problem with the prior art methods is that several production stages and sometimes a composite of different materials are required to successfully bond the edges of the amorphous metal core laminations while also preventing chip or flake penetration from the core to the coils.

Another problem with prior art methods is that it is very difficult to handle the often highly viscous materials used to bond the core laminations together. Also problematic is the chip formation that occurs during the final assembly of the laminations into a coil due to a very flexible core combined with a relatively flexible adhesive material.

SUMMARY OF THE INVENTION

The present invention relates to a magnetic core made of a plurality of lamination layers, at least a portion of which are made of amorphous metal. The lamination layers make up a core that has two edges which define opposite sides of the magnetic core. Applied to at least a portion of one side of the magnetic core is a low-stress thermoset coating material. The coating material is of sufficiently low viscosity at room temperature to permit easy application in a manufacturing environment of the coating material to the lamination layers of the magnetic core with only modest penetration of the coating material between the lamination layers. The coating material is also capable of being cured incrementally to permit stress relief within the laminations and finally curing to a rigid state of sufficient strength to hold the laminations in correct assembled relationship. The present invention also relates to a transformer made from the magnetic core described herein.

DETAILED DESCRIPTION OF THE INVENTION

Figure 1:
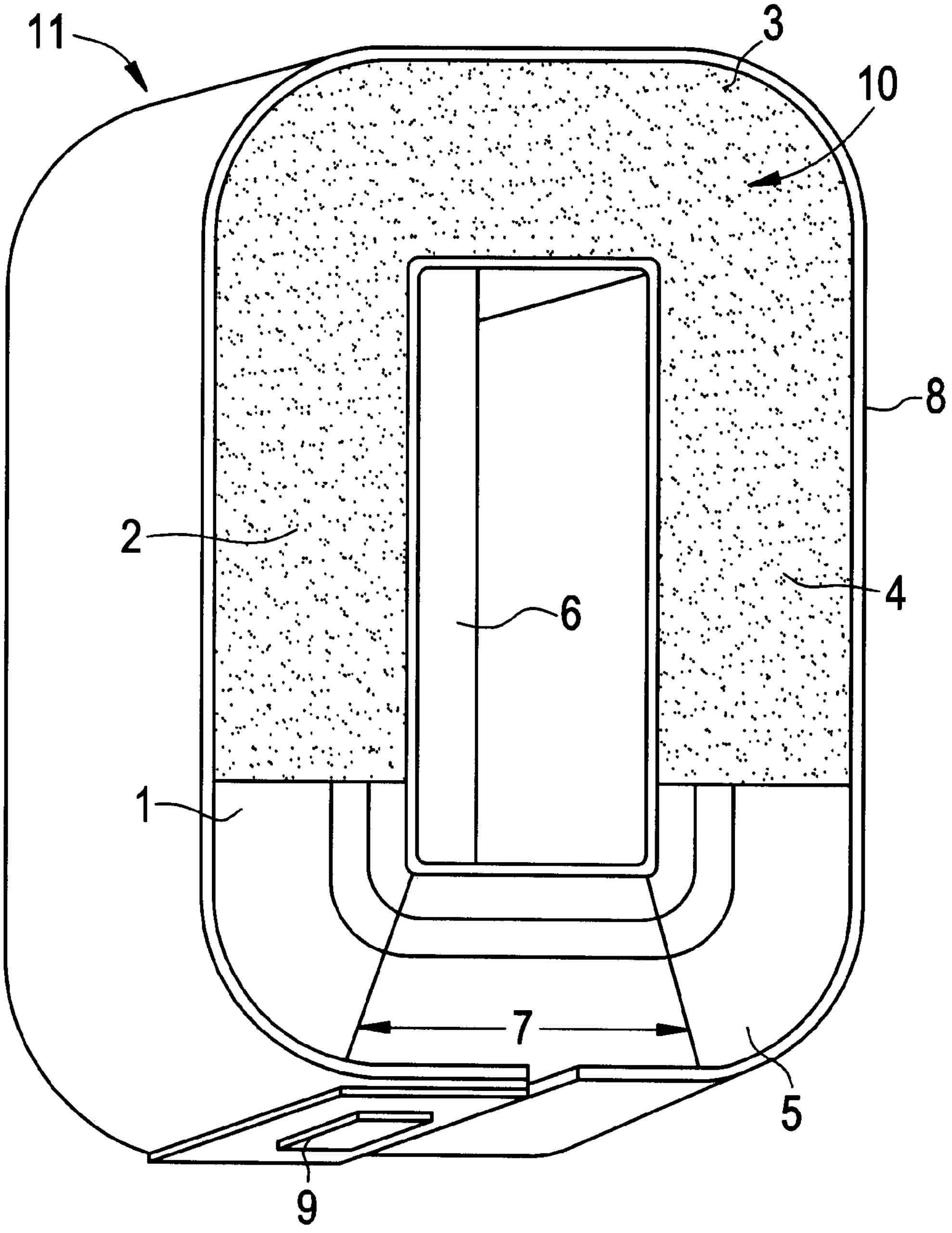
FIG. 1 is a diagrammatic and schematic representation of a magnetic core which may be constructed according to the present invention.
Figure 2A:
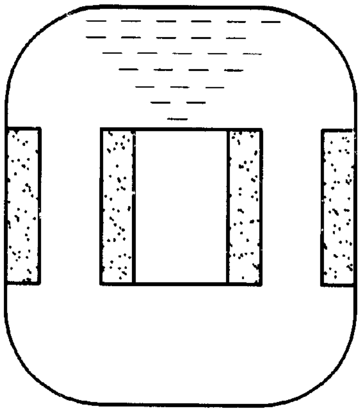
FIG. 2 is a series of diagrams showing various application schemes for the adhesive material of the present invention on the edges of the lamination layers.
Figure 2B:
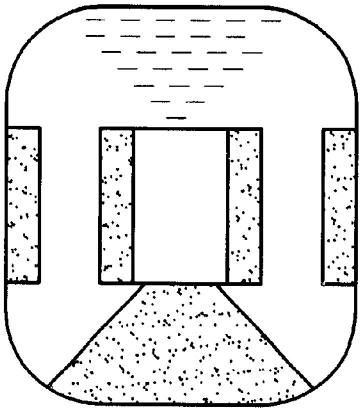
Figure 2C:
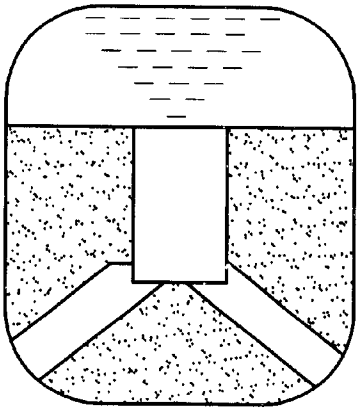
Figure 2D:
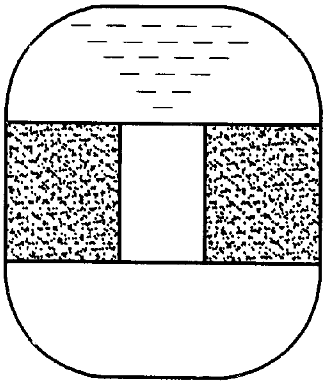
Figure 2D:

FIG. 1 shows a plurality of laminations 1 wound to form a magnetic core 11 having a substantially rectangular cross-section with leg portions 2 and 4, upper and lower yoke portions 3 and 5, respectively, which define a rectangularly shaped window 6. A distributed gap 7 is usually formed in a yoke portion of the core by staggered overlapping ends of the laminations 1. A support or perimeter band 8 or other form of restraint usually covers the outer portion of the laminations to temporarily hold them in correct assembled relationship.

Once the laminations of the magnetic core have been formed and a support or perimeter band 8 or other restraint applied, a coating material 10 is applied to the edges of the laminations 1 over at least a portion of the entire core edges, e.g., over the upper yoke 3 and substantial portion or all of legs 2 and 4. Cross-wise support bands (not shown) are sometimes used in addition to the perimeter or support band, primarily in the larger magnetic cores. Alternatively, the coating material can be applied over select portions of legs 2 and 4, and/or over select portions of yoke 3. For example, FIG. 2 demonstrates a number of different application schemes for the coating material.

The coating material comprises a low-stress thermoset material of sufficiently low viscosity at room temperature to permit quick and easy manufacturing application with only modest impregnation of the coating material between lamination layers. Although only modest impregnation of the coating material between the lamination layers has little to no effect on the core losses, significant impregnation of the coating material is not desired as it tends to increase the core losses of the resulting transformer. It is also important that the coating material be allowed to cure to a state that allows some or all of the restraining materials or tooling to be released thereby allowing stresses which have built up within the lamination layers to relax out. Finally the coating material must also be capable of curing or setting to a rigid state of sufficient strength to hold the laminations in correct assembled relationship.

One type of coating material which has been found satisfactory is a thermoset resin which has a relatively low viscosity upon application and then cures incrementally further after being applied to the lamination layers but which is then later cured to a fully rigid state. One example of such a thermoset coating material is an epoxy resin. An epoxy resin according to the invention is applied while in the A-stage and then is cured to the B-stage (partially cured stage) after application. Alternatively, the coating material may be applied directly in the B-stage. Upon fully curing the epoxy, it becomes sufficiently rigid that it holds the lamination layers of amorphous material in an assembled relationship even after support or perimeter band 8 is released and subsequently removed.

Although epoxy resin is one coating material preferred according to the present invention, it will be appreciated by the skilled artisan that many resins (primarily thermoset resins) and adhesives would suffice. For example, other thermoset resins which are exemplary of the coating material of the present invention include polyesters, silicones, phenolics (phenol-formaldehyde), ureas (urea-formaldehyde) and melamines (melamine-formaldehyde), etc.

It has been found that application of the coating material while in the low viscosity or uncured state allows for easy and uniform application of the coating material while preventing significant penetration of the coating material between the lamination layers. For this reason, it is preferred that the viscosity of the coating material at room temperature is no greater than about 50,000 cps and preferably no greater than about 25,000 cps, and most preferably no greater than about 15,000 cps. It will be appreciated that the viscosity of the coating material will drop even further during or after it is initially applied and begins the curing process due to the exothermic nature of the curing reaction.

It is also important that the coating material which is to be used on lamination layers in oil-filled and silicone-filled transformers is compatible with the oil or silicone used in the transformer. By compatible, it is meant that the coating material not be degraded to any appreciable degree by the fluids used in transformers and that the oil or silicone substantially retain their beneficial properties.

The coating material may be applied so as to cover all the lamination layers, without any holes or gaps in the coating material, over at least yoke 3 and legs 2 and 4. Alternatively, as mentioned earlier, the coating material may be applied over select portions of the legs and/or yoke, in a manner that provides not only structural integrity to the lamination layers, but also permits stresses to relax out of those areas where such stresses are greatest. For example, by applying the coating material to only a portion of legs 2 and 4, and primarily in the middle of yoke 3, the many stresses which reside in the corners connecting legs 2 and 4 to yoke 3 are allowed to relax out. A number of exemplary application schemes are depicted in FIG. 2.

It must be noted, however, that when the coating material is applied over just portions of the legs 2 and 4 or yoke 3, such as depicted in FIG. 2, the coating material should be allowed to cure to a much greater extent, preferably completely, before the support or perimeter band is released. Stress relief in these instances is achieved because the laminations have not been locked into position in all locations. Rather, the laminations are free to relax out built-in stresses in those areas not completely covered by the coating material.

The coating material may, however, be applied in the same or different patterns from one side to the other. For example, one side may be covered according to FIG. 2A while the other may be according to FIG. 2B, 2C or 2D. The support band 8 can be removed after just one side of the lamination layers is coated and cured or after both sides of the lamination layers have been coated and cured. In a preferred embodiment of the invention, the coating material is applied to only one side of the lamination layers which is allowed to cure fully or it is applied to select portions of both sides of the lamination layers which are also allowed to cure fully before the support band is released. In this manner, stresses in the lamination layers are allowed to release out of the amorphous metal through the uncoated side or uncoated portions on either side. Consequently, a transformer made according to the present invention can result in significantly lower overall core losses.

In an alternative embodiment, the coating material is applied to the edges of the lamination layers on both sides of the core. The coating material is allowed to B-stage or partially cure, at which point several spacers (tooling) which have been placed between the outermost lamination layer and the support or perimeter band 8 are removed, thereby allowing the lamination layers to relax out in a controlled manner, thereby relieving built-in stresses while maintaining the requisite dimensions of the core structure. Once both sides have cured sufficiently, the support or perimeter band 8 is removed.

The present invention is in marked contrast to the prior art, where composite coating materials are applied and allowed to set to a rigid state on both sides of the lamination layers before restraining materials are removed. It is believed that this process retains virtually all of the stresses incurred during construction of the transformer.

Another embodiment of the present invention is the so-called chip-containment means. In this embodiment, the coating material is applied over virtually the entire surface on both sides of the lamination layers in a relatively uniform fashion of sufficient thickness to prevent chip or flake penetration through the coating material but not so thick that it adds significantly to the dimensions of the magnetic core. The only portion of the edges of the lamination layers not covered by the coating material is covered with a layer of oil permeable tape or other material which allows the lamination layers to receive oil. In this embodiment, it is preferred that one side of the lamination layers be coated and cured and then the support band released, or that both sides are coated, B-staged, the spacers removed, and then cured before the support band is released. Additionally, after yoke 3 and legs 2 and 4 are fully coated, the lamination layers of the core are laced together to form distributed gap 7. The oil permeable tape or other material is applied to the edges in at least one spot along legs 2 and 4 and/or along the yoke at either end of the core. Finally, the coating material is applied to all uncovered portions of the edges of the lamination layers, e.g. yoke 5 and distributed gap 7. In this manner, the losses are kept to a minimum while providing for an easy and effective method to contain amorphous metal chips or flakes.

EXAMPLES

Example 1

To demonstrate the unique advantages of the present invention, several amorphous metal transformers were constructed using the method of the present invention and the properties of these transformers were compared with several amorphous metal transformers prepared using an oil-resistant elastomer-based adhesive (Glue Product in Table 1) sold by the 3M Company as EC-1458. The coating material according to the present invention was Dobeckot 505C epoxy with hardener EH411 available from Dr. Beck Company. All glue products were prepared by brushing on a layer of EC-1458 to yoke 3 and legs 2 and 4 followed by exposing the cores to an infrared bake oven which causes the glue to dry. The state of the coating material, method of application, curing time and procedure are indicated in Table 1.

From the results in Table 1, it can be seen that the coating material of the present invention achieves roughly the same degree of stress relief as the more flexible elastomeric glue while being solvent-free and ultimately providing enhanced structural support and better chip containment.

Example 2

Table 2 shows losses (in wafts) using the methods and coating material in accordance with the present invention. Losses are shown at both the core and the transformer level. These values compare favorably to even the flexible elastomer-based glue in Example 1 for which losses tend to fluctuate between about 15.8 watts and 18 watts, with an average around 16.6 watts.

Example 3

Table 3 shows a comparison between the coating material and methods of this invention and full coating of cores using thermoset epoxy material where the epoxy is fully cured before removal of any restraiing material or other tooling. As can be seen from Table 3, the method and coating materials of the present invention can result in a decrease in losses on the order of about 20–25%. It is preferred that the magnetic core losses according to the invention will be at least 10% lower than the same core made by curing the epoxy fully before removal of any restraining material or other tooling, and more preferably at least about 15% and most preferably at least about 20%.

TABLE I

EDGE BONDING/CHIP CONTAINMENT TRIALS

| Trial # | Application Method | Weight of Material on Core (lbs) | Cure Method | Losses in Watts: Glue Prod. Avg.* | Losses in Watts: Dr. Beck | Final Test Transformer Losses, Watts (Dr. Beck) |
|---|---|---|---|---|---|---|
| 1 | Brushed. | 0.3 | Ambient/30–45 min.<br>Bake 122–126 F/45 min. | 16.3, s = .9 | 18 | 17.3 (i) |
| 2 | Brushed. | 0.2 | (a) Ambient to B-stage for 2 hr.;<br>(b) Remove outside band;<br>(c) Ambient dwell for 35–45 min.;<br>(d) Heat 190–202 F for 15 min. | 17.8, s = .8 | 18.1 | 20 (ii) |
| 3 | Brushed on aged (1.25 hr) material from Trial #2. | 0.4 | (a) Ambient cure .5 hr.;<br>(b) Remove outside band;<br>(c) Heat to full cure:<br>to 200 F/20 min.;<br>190–200 F/15 min. | 17.8, s = .8 | 18.2 | 20 |
| 4 | Brush (used 6 stripes/side). | 0.15 | (a) Ambient/2 hr.;<br>(b) Heat 142–150 F/45 min. | 17.7, s = 1.2 | 17.5 | 18.7 |
| 5 | same method as Trial #4. | 0.15 | (a) Ambient overnight | 17.7, s = 1.2 | 18.4 | 20.3 |
| 6 | (a) Brush coat in a vertical position. | 0.2 | (a) Ambient (80 F) for 1.5 hr. | 17.5, s = .8 | Vertical position:<br>a) 20.6 (w/band)<br>a') 19.6 (w/o band)<br>b) 19.9 after 24 hr. (w/o band)<br>Horizontal position:<br>19 | 18.8 |
| | (b) 2nd coat using fresh resin mix. | 0.2 | (b) After 2nd coat, ambient/24 hr. | | | |

TABLE I-continued

EDGE BONDING/CHIP CONTAINMENT TRIALS

| Trial # | Application Method | Weight of Material on Core (lbs) | Cure Method | Losses in Watts: Glue Prod. Avg.* | Losses in Watts: Dr. Beck | Final Test Transformer Losses, Watts (Dr. Beck) |
|---|---|---|---|---|---|---|
| 7 | (a) Brush coat in a vertical position. | 0.2 | (a) Ambient (80 F) for 2 hr. | | Vertical position: a) 20.2 (w/band) a') 19.8 (w/o band) b) 20.2 after 24 hr (w/o band) | 21.3 (iii) |
| | (b) 2nd coat using aged resin mix (aged 65 min.) | 0.3 | (b) After 2nd coat. | | Horizontal position: 19.3 | |
| 8 | (a) Brush on one side of core in horizontal position using fresh resin mix. | 0.2 | (a) Ambient/24 hr. | 16.5, s = .43 | Vertical position: a) 18.1 (w/band) a') 17.3 (w/o band) Horizontal position: 16.7 | |
| | (b) Coat 2nd side (w/band off) in vertical position using fresh resin mix. | 0.2 | (b) Ambient cure for weekend. | | | |
| 9 | (a) Brush one side of core in horizontal position using aged (55 min.) resin mix; | 0.2 | (a) Ambient/24 hr. | | Vertical position: a) 18.7 (w/band) a') 17.4 (w/o band) | 18.4 |
| | (b) As in Trial #8 but using aged (50–55') resin mix. | 0.3 | (b) Ambient cure for weekend | | Horizontal position: 17 | |
| 10 | (a) Coated aged mat'l. vertically on 1 side; (b) After 2 days, band removed & 2nd site coated w/new aged mat'l. | 0.35 total | | 16.97, s = .88 | Vertical position: a) 19.9 (before epoxy) a') 18.4 (w/o band & 2nd side coated) Horizontal position: 17.3 (after 2nd side was coated) | 17.7 |
| 11 | Applied aged epoxy as a thick coat to both sides, vertically. | 0.4 total | One (1) hour air cure; then band removed. | 18, s = 1.22 | Vertical position: a) 21.9 (before epoxy) a') 20.7 (after material cured overnight; data w/o band) Horizontal position: 20.4 | 20.2 |
| 12 | a) Brushed on 1st side in horizontal position | 0.1/side | (a) Side 1 cured at 195–205 F/1 hr. | 16.1, s = .47 | Vertical position: a) 27.1 (w/band) a') 20.2 (w/o band) Horizontal position: | |
| | b) Brushed on 2nd side vertically using fresh resin mix, after band removal. | | (b) Side 2 cured in ambient. | | b) 17.8 | |
| 13 | Same as #12 above. | 0.2/side | Same as #12 above | 25.5, s = .79 | Vertical position: a) 34.7 (w/band) a') 30.3 (w/o band) Horizontal position: b) 27.1 | |

TABLE I-continued

EDGE BONDING/CHIP CONTAINMENT TRIALS

| Trial # | Application Method | Weight of Material on Core (lbs) | Cure Method | Losses in Watts: Glue Prod. Avg.* | Losses in Watts: Dr. Beck | Final Test Transformer Losses, Watts (Dr. Beck) |
|---|---|---|---|---|---|---|
| 14 | a) Brushed on 1st side in horizontal position with material (mixed) aged for 50' prior to application b) Brushed on 2nd side in vertical position after band removal using new batch of resin mix, but aged for 55 minutes. | 0.3/side | (a) Ambient cured both sides; side one for 1 hr. | 25.5, s = .79 | Vertical position: a) 32.1 (w/band) a') 28.5 (w/o band) Horizontal position: b) 26.2 | |
| 15 | Same as #14 above. | 0.1/side | As in #14 above. | 16.1, s = .47 | Vertical position: a) 21.8 (w/band) a') 18.6 (w/o band) Horizontal position: b) 17.3 | |
| 16 | Glue process | | | 25.5 | Horizontal position: 24.9 | |
| 17 | Glue process | | | 16.1 | Horizontal position: 16.5 | |

*All glue product average core losses were measured in the horizontal position.
(i) Core was dropped, and replaced outer band.
(ii) Core initially at 115 F.
(iii) Entombed at lacing station using aged 505 C material mix 0.1 lb/side; Removed box.

TABLE II

Losses on cores coated with Dobeckot 520 F/Hardener EH-411 (Resin 100 pbw, hardener 55 pbw) Core size: 151

| CORE | CORE WATT LOSS (100% VOLTS) | TRANSFORMER LOSSES |
|---|---|---|
| 1 | 16.63 (0.10 watts/lb.) | 17.4 |
| 2 | 16.56 (0.10 watts/lb.) | — |
| 3 | 17.13 (0.11 watts/lb.) | 17.5 |
| 4 | 16.82 (0.10 watts/lb.) | 18.2 |

TABLE III

LOSS RESULTS ON RIGID CORES WITH DOBECKOT 52O F/HARDENER EH-411 (100/55 pbw)

| CORE | NOTATION | WATTS LOSSES 100% VOLTS | METHOD | WATTS LOSSES (AVG.) ON FULL COAT/FULL CURE EPOXY SYSTEM |
|---|---|---|---|---|
| 1 | 204 | 19.9 | Cut band before coating side 2 | 24.9 |
| 2 | 202 | 24.4 | B-staged at band removal | 30.3 |

What is claimed is:

1. A method for coating the edges of a magnetic core containing strips of amorphous metal, the method comprising:

assembling a plurality of lamination layers, at least a portion of which are constructed of amorphous metal, so as to define a core that has two edges defining opposite sides of a magnetic core;

affixing a restraint to said lamination layers, said restraint retaining said lamination layers in correct assembled relationship;

coating at least a portion of the edge of one side of said core with a low-stress thermoset material;

removing at least a portion of said restraint from said lamination layers to relax said lamination layers when said low-stress thermoset material is partially cured; and fully curing said thermoset material to a rigid state after said removing at least said portion of said restraint.

2. The method of claim 1, wherein the viscosity of said thermoset material is less than about 50,000 cps at room temperature.

3. The method of claim 1, wherein thermoset resin material comprises an epoxy, polyester, silicone, phenolic, urea or melamine resin.

4. The method of claim 1, further including:

coating at least a portion of the edge of another side of said core with said low-stress thermoset material after said fully curing said thermoset material on said one side.

5. A method for coating the edges of a magnetic core containing strips of amorphous metal, the method comprising:

assembling a plurality of lamination layers, at least a portion of which are constructed of amorphous metal, so as to define a core that has two edges defining first and second sides of a magnetic core;

affixing a restraint to said lamination layers, said restraint retaining said lamination layers in correct assembled relationship;

coating at least a portion of the edge on said first side of said core with a curable, low-stress thermoset material;

fully curing said thermoset material on said first side of said core;

removing said restraint from said lamination layers to relax said lamination layers after said fully curing said thermoset material on said first side of said core; and coating at least a portion of the edge on said second side of said core with said low-stress thermoset material after said removing said restraint.

6. The method of claim 5, wherein only select portions of the edges of said lamination layers are coated, and wherein said select portions are the same or different on either side of the magnetic core.

7. A method for coating the edges of a magnetic core containing strips of amorphous metal, the method comprising:

assembling a plurality of lamination layers, at least a portion of which are constructed of amorphous metal, so as to define a core;

wrapping a restraint around at least a portion of said core, said restraint retaining said lamination layers in correct assembled relationship;

arranging a spacer between said restraint and said lamination layers;

coating at least a portion of both sides of said core with a thermoset material;

removing said spacer to relax said lamination layers after said thermoset material is partially cured; and removing said restraint after said removing said spacer.

8. The method of claim 7, wherein said restraint is removed after said thermoset material is fully cured.

* * * * *